DUAL HEAD FOR A MULTI-NEEDLE SEWING MACHINE
Original Filed Dec. 22, 1971 3 Sheets-Sheet 1
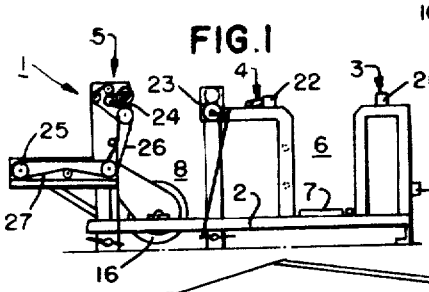
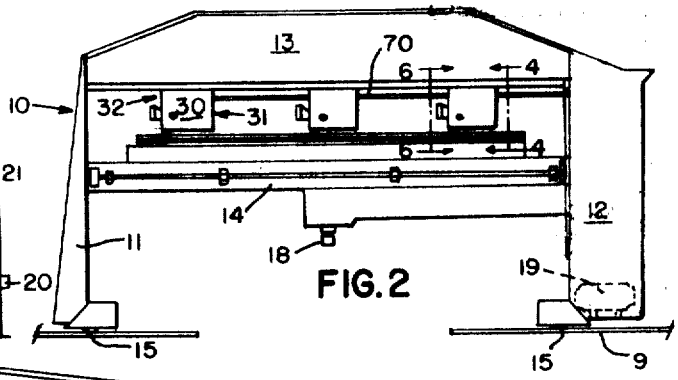
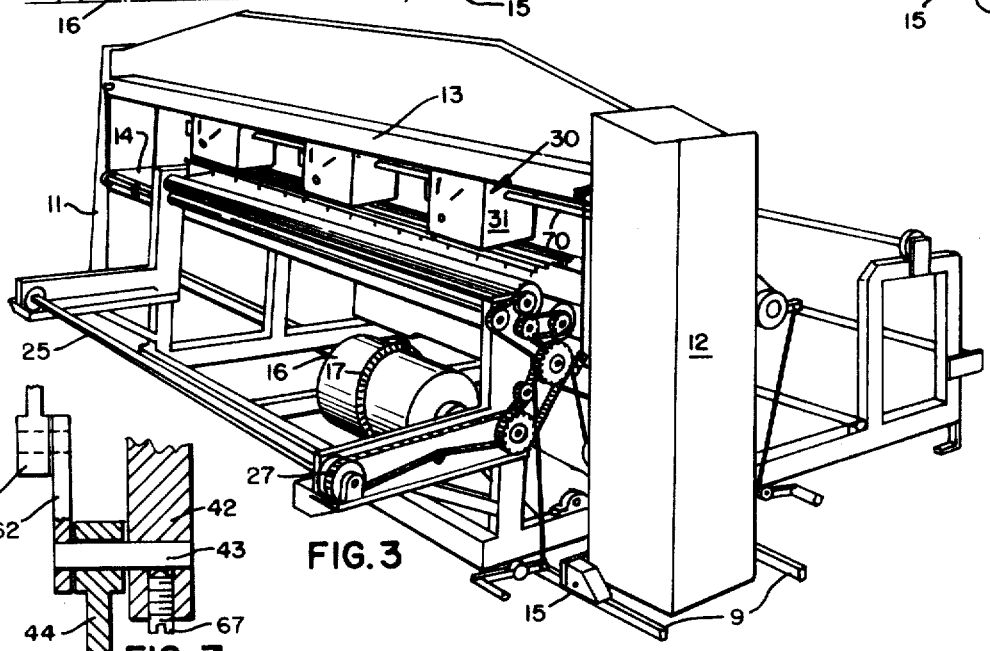
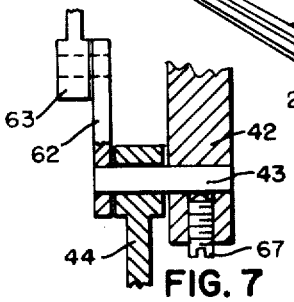
FIG. 4
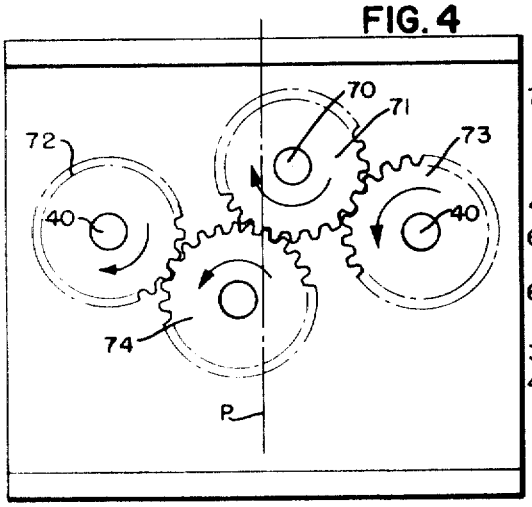
FIG.5
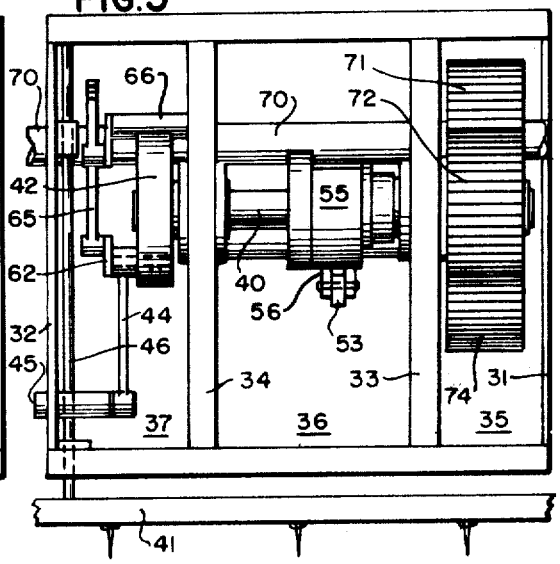

DUAL HEAD FOR A MULTI-NEEDLE SEWING MACHINE

Original Filed Dec. 22, 1971 3 Sheets-Sheet 2

DUAL HEAD FOR A MULTI-NEEDLE SEWING MACHINE

Original Filed Dec. 22, 1971 3 Sheets-Sheet 3

United States Patent Office

Re. 28,204
Reissued Oct. 15, 1974

28,204
DUAL HEAD FOR A MULTI-NEEDLE SEWING MACHINE

David R. Cash, Louisville, Ky., assignor to James Cash Machine Co., Louisville, Ky.

Original No. 3,749,037, dated July 31, 1973, Ser. No. 210,903, Dec. 22, 1971. Application for reissue May 22, 1974, Ser. No. 472,153
Int. Cl. D05b *11/00*
U.S. Cl. 112—117 7 Claims

Matter enclosed in heavy brackets [ ] appears in the original patent but forms no part of this reissue specification; matter printed in italics indicates the additions made by reissue.

ABSTRACT OF THE DISCLOSURE

A *multi or* dual head for a multi-needle machine of the type sewing a series of long (straight or zigzag) lines of stitching into an elongate sheet of bedding material passing through the machine, comprising: (A) a box frame; (B) frame-mounted 1st and 2nd dual sewing machine heads; and (C) a common means for positively driving said dual heads in a substantially fixed phase relationship.

The dual sewing heads, on opposite sides of a transverse separating plane passing vertically through the box frame, comprise: (1) 1st and 2nd multi-needle bars for carrying 1st and 2nd successions of sewing needles; (2) 1st and 2nd means for positively reciprocating the multi-needle bars vertically; (3) 1st and 2nd presser-foot bars for carrying 1st and 2nd successions of presser feet; (4) 1st and 2nd means for positively reciprocating the presser-foot bars vertically; (5) 1st and 2nd thread pull levers; and (6) 1st and 2nd means for oscillating the thread pull levers.

By reversely operating the 1st and 2nd dual heads in 180° out-of-phase relationship, the vibrations of one head are counter-balanced by the vibrations of the other head to such an extent that it is possible to increase the operating speed in substantial measure. By positively driving each head from a common drive, they move in a fixed phase relationship so that identical sewing and presser foot operations are obtained and sewing speed, stitch-length and other related variations between heads thereby eliminated. By adjusting the angular position of the thread pull lever one way or the other, its thread pulling function can be advanced or retarded.

BACKGROUND OF THE INVENTION

Field of The Invention

This invention relates to multi-needle machines of the type sewing a series of long "parallel" lines of stitching into an elongate sheet of bedding material passing through the machine.

Description Of The Prior Art

The Cash Patent #3,192,886 granted July 6, 1965 discloses a multi-needle machine of the type to which the present invention relates. It comprises: a frame-mounted sewing means including a single multi-needle bar carrying a succession of sewing needles and means for reciprocating the multi-needle bar vertically; and a single frame-mounted presser foot means including a presser-foot bar carrying a succession of presser feet and means for reciprocating the presser foot bar vertically.

Haberstump #2,238,773, Charles #3,162,155 and Nowicki #3,249,078 likewise disclose single head multi-needle machines.

Nowicki #3,396,687 discloses a multi-needle machine in which two needle bars are horizontally reciprocated in 180° out-of-phase relationship but both needle bars reciprocate up and down together in the same phase relationship. Other multi-needle machines have *multi or* dual heads but employ separate and independent drives which permit stitch length (and other) variations therebetween.

SUMMARY OF THE INVENTION

Objects Of The Invention

The principal object of the present invention is to provide a simple improvement which substantially reduces the inherent vibration and correspondingly permits a substantial increase in production.

Another important object is to provide a *multi or* dual head multi-needle sewing machine with a simple improvement, which substantially eliminates stitch length and other related variations between the heads.

Another desirable object is to provide an easy and simple means for adjusting the angular position of the thread pull levers one way or the other so as to correspondingly advance or retard their respective thread pulling functions.

Statement Of The Invention

All of the more important objectives of the present invention are substantially achieved by driving both heads (including the sewing heads, the presser-foot means and the thread pulls) positively from a common drive means and in an out-of-phase relationship closely approximating 180°. The common positive drive causes their corresponding parts to move in a fixed phase relationship, which eliminates sewing speed, stitch length and like variations between heads and correspondingly insures identical sewing operations with identical results. The 180° out-of-phase relationship causes the inherent vibrations of one head to be substantially cancelled or counter-balanced by the inherent vibrations of the other head and correspondingly permits the operating speed to be very substantially increased.

In conventionally constructed sewing machines, it is common practice to provide the sewing head with a rotary operating shaft, mount a crankwheel on that shaft, provide that wheel with an offset crank or wrist pin and use a connecting rod or pitman to link that pin with the vertical reciprocating rod which carries the needle bar.

Another object of the present invention is accomplished by making the angular position of such crank or wrist pin adjustable, providing that adjustable pin with a rigid radial link or arm and mounting the middle of the oscillating thread pull lever on the outer end portion of that arm. With this arrangement, the angular position (of the rigid unit formed by the wrist pin and radial arm) can be easily and quickly adjusted one way or the other to advance or retard pull of the lever on the sewing thread without otherwise affecting the operation of the sewing head or associated means.

BRIEF DESCRIPTION OF THE DRAWINGS

The preferred embodiment of the invention is illustrated in the accompanying drawings wherein:

FIG. 1 is a somewhat schematic side elevation of the base frame with its front end at the left;

FIG. 2 is a somewhat schematic front side elevation of the A-frame;

FIG. 3 is a perspective view of the assembled base and A-frames, this view looking at a front corner of the machine with the front end of the machine and the front side of the A-frame at the left and with that side of the base frame, which is seen in FIG. 1, at the right;

FIG. 4 is an end elevation of the drive gear end of one of the box frames corresponding to one taken along line 4—4 of FIG. 2 with the adjacent end plate removed;

FIG. 5 is a front side elevation of one of the box frames with the adjacent side plate removed to show the needle end at the left and the drive gear end at the right;

FIG. 7 is a fragmentary section corresponding to one taken along line 7—7 of FIG. 6A;

DESCRIPTION OF THE PREFERRED EMBODIMENT

Conventional Structure

Figure 6A:
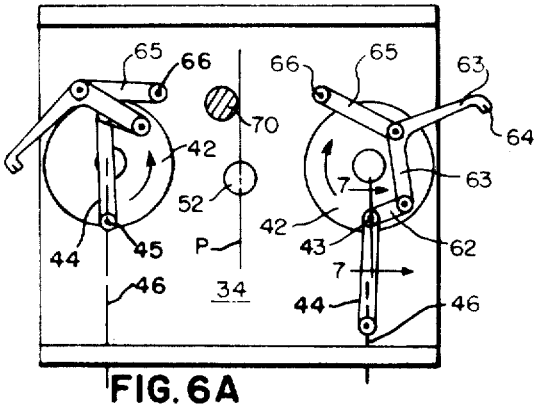
FIGS. 6A, 6B, 6C and 6D are somewhat schematic end elevations of the needle end of one of the box frames corresponding to one taken along line 6—6 of FIG. 2 with the adjacent end plate removed and with the presser foot operating mechanism omitted, these views showing the left head up in A, partly down in B, entirely down in C and partly up in D and showing the right head (which is the one seen in FIG. 5) down in A, partly up in B, entirely up in C and partly down in D.
Figure 6B:
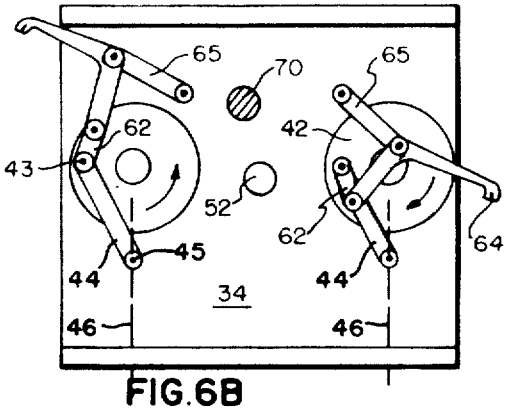
Figure 6D:
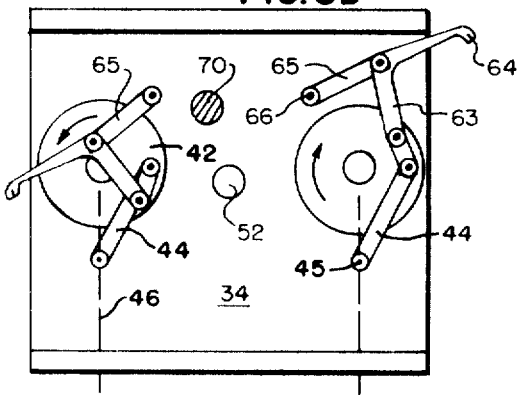
Figure 6C:
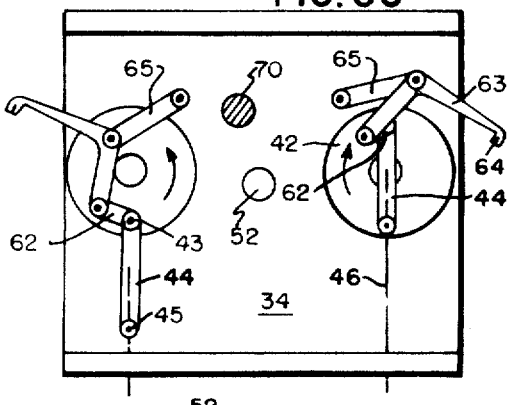

The dual head sewing machine illustrated in the drawing is not entirely old in structural design but, for the sake of simplicity, it is viewed as conventionally comprising: (A) an integral stationary base frame; (B) a transversely movable A-frame; (C) means for transversely reciprocating the A-frame; (D) material supply means; and (E) material feed and tensioning means.

Base frame

The stationary base frame 1, which is skeletonized throughout, comprises: (1) an elevated bottom platform frame 2; (2) rear, center and front upright sections 3, 4 and 5; (3) a pair of alleyways including a rear access alleyway 6 located between the rear and center sections 3, 4 and provided with a bottom floor 7, and a front A-frame-receiving alleyway 8 located between the center and front sections 4 and 5; and (4) two pairs of A-frame supporting tracks 9 carried by the under side of the platform frame 2, at each end of the front alleyway 8, one pair for each end of the A-frame. See FIG. 3.

A-frame

The transversely movable A-frame 10 comprises: (1) a pair of transversely spaced upright side standards 11, 12; (2) a pair of vertically spaced horizontal cross frame members 13, 14 interconnecting the side standards, one at the top of the A-frame and the other at an intermediate elevation between the top and bottom of the A-frame; and (3) transportation wheels 15 mounted on the side standards to engage the A-frame supporting tracks.

Reciprocating means

The A-frame reciprocating means comprises: (1) a rotary cylinder 16 located at the bottom of the front alleyway 8 and mounted on the underlying platform frame 2; (2) an endless zigzag guide track 17 encircling and rigidly mounted on the periphery of the cylinder 16; (3) a follower 18 on the A-frame depending into driving engagement with the zigzag guide track 17 on the cylinder 16; and (4) a drive motor 19 mounted in the side standard 12 of the A-frame and operatively connected to drive the follower 18 so that, through the engagement of the follower with the zigzag guide track 17, the follower rotates the rotary cylinder 16 and, in doing so, reciprocates the A-frame 10, which moves along the front alleyway 8 from right to left and vice versa.

Material supply, feed and tensioning means

The material supply, feed and tensioning means comprises: (1) several rolls of material mounted on suitable rotary supports including a pair of rotary supports 20, 21 on the rear section and a rotary support 22 on the center section; (2) a pair of rear-tensioning pinch-rolls 23 on the center section 4 along the rear side of the upper end or mouth of the front alleyway 8; (3) another pair of front-feeding pinch-rolls 24 on the front section along the front side of the mouth of the front alleyway 8; and (4) a rotary support 25 for a rewind roll at the front end of the base frame. The materials (from the rolls on the rear section rotary supports 20 and 21) are trained to pass underneath the floor 7 of the rear alleyway 6 and then pass upwardly to join the material from the roll on the center section rotary support 22, whereupon all three materials pass forwardly 1st through the rear-tensioning pinch-rolls 23, next across the open mouth of the front alleyway 8, during which said materials pass through the sewing zone, thence through the front-feeding pinch-rolls 24 and finally to the rewind roll on support 25.

The foregoing material is fed forwardly by driving the front-feeding pinch-rolls 24 through a train of mechanism 26, which is connected to and driven by the shaft of rotary cylinder 16 of the A-frame reciprocating means. To drive the rewind roll support 25 from the shaft of rotary cylinder 16, it is connected to the train of mechanism 26 by belt 27.

The material, thus fed, is tensioned in the "open mouth" sewing zone between the front and rear pinch-rolls 24, 23, by frictionally braking the rear pinch-rolls 23 in any suitable yieldable way and thereby yieldably resisting the pull of the front pinch-rolls 24 to a desired degree, which may be varied by adjusting the frictional brake.

Inventive Structure

The *multi or* dual head structure comprises: (A) a box-frame; (B) frame-mounted dual heads; and (C) a common drive for said heads.

Box-frame

A series of box-frames are located at spaced intervals along the space extending transversely between the side standards 11, 12 and vertically between the upper and lower cross frame members 13, 14 of the A-frame 10. This series includes: (1) one box-frame 30 at the left end portion of that space; (2) another box-frame 30 at the right end portion of that space; and (3) as many intermediate box-frames as may be desirable or necessary, only one intermediate box-frame 30 being shown.

Each box frame 30 has: (1) top and bottom walls; (2) front and rear side walls; (3) opposite end walls 31, 32; and (4) between end walls 31 and 32, a pair of partitions 33, 34 dividing the interior of the box-frame into a series of 3 chambers including (a) a "gear" chamber 35 between end walls 31 and partition 33, (b) an "eccentric" chamber 36 between the two partitions 33, 34 and (c) a "reciprocating" chamber 37 between end wall 32 and partition 34. Each box-frame is rigidly secured to the upper cross frame member 13 of the A-frame by bolting its top wall thereto.

Frame mounted dual heads

The dual heads include: (1) 1st and 2nd sewing heads, which are provided in each box-frame and which are located on opposite sides of a transverse separating plane P (see FIG. 4) passing vertically through the mid-portion of the box-frame 30; (2) presser foot means; an (3) 1st and 2nd thread pull means.

Each sewing head conventionally includes: (1) an operating shaft 40 extending through the box-frames 30 from gear chamber 35 to reciprocating chamber 37; (2) a needle bar 41 carrying a succession of needles; and (3) motion converting means interconnecting the operating shaft 40 with the needle bar 41, this motion converting means comprising (a) a crank wheel 42 located in the reciprocating chamber and mounted on the end of the operating shaft 40 to rotate therewith, (b) a crank or wrist pin 43 mounted on wheel 42 but offset from the center thereof to provide a crank arm of desired length, (c) a link or pitman 44 interconnecting the crank pin 43 with a vertically reciprocating pin 45 which extends horizontally through a vertical slot, by the walls of which it is guided in vertical reciprocating motion, and (d) rod 46 for supporting the needle bar 41 from the reciprocating pin 45. Each sewing head also includes conventional thread locking mechanism (not shown) housed in the lower cross frame member 14 and positively driven by motor 19 in timed relationship with the needles on needle bar 41.

Figure 8:
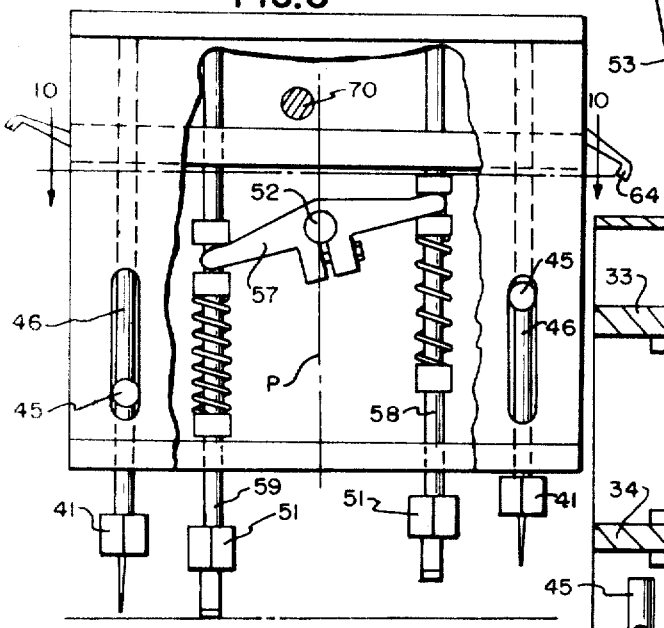
FIG. 8 is an end elevation of the needle end of one of the box frames with its corresponding end plate broken away to show the "seesaw" arrangement for operating the 1st and 2nd presser feet in 180° out-of-phase relationship, this view corresponding to FIG. 6C but omitting the needle operating mechanism thereof except for the horizontal needle bar and the vertical bar-reciprocating rod.
Figure 9:
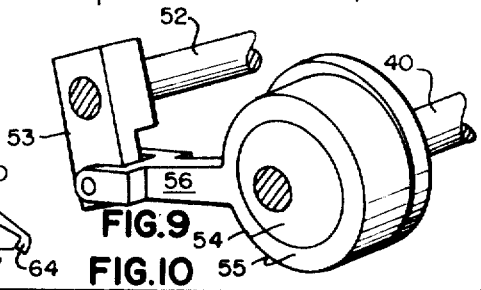
FIG. 9 is a perspective view of the eccentric reciprocating mechanism for rocking the seesaw of FIG. 8.
Figure 10:
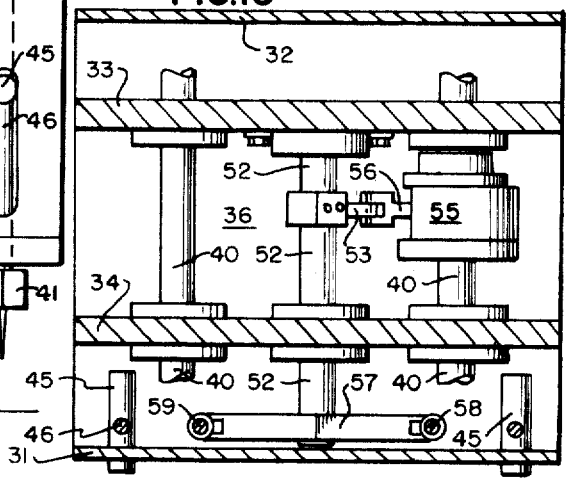
FIG. 10 is a top view of the seesaw rocking mechanism of FIGS. 8–9, this view corresponding to a horizontal section taken along line 10—10 of FIG. 8 but omitting the gears and shafts in the gear chamber, crank wheel and needle reciprocating mechanism in reciprocating chamber.

The presser foot means conventionally includes: (1) 1st and 2nd presser-foot bars 51, and (2) unconventional motion converting means interconnecting one operating shaft 40 with the presser-foot bar 51 (see FIG. 8) in accordance with one feature of this invention. This unconventional means comprises: (a) a rockshaft 52 mounted on the partition walls 33, 34 to extend through the eccentric and reciprocating chambers 36, 37; (b) means for rocking the rockshaft 52, said means including a rock arm 53 located in eccentric chamber 36 and mounted on rockshaft 52, and means interconnecting only one of the two operating shafts 40 with rock arm 53 to rock the rockshaft 52, said interconnecting means including (see FIG. 9) a rotating eccentric 54 encircling and mounted on operating shaft 40 to rotate therewith, a non-rotating circular collar 55 encircling the eccentric, and a link 56 interconnecting the collar 55 with the outer end of the rockshaft arm 53 on rockshaft 52; and (c) means converting said rocking movement of rockshaft 52 into vertical reciprocating movement, such means including (see FIG. 8) a teeter-totter 57 mounted on rockshaft 52 within the reciprocating chamber, and 1st and 2nd vertical rods 58, 59 interconnecting opposite ends of the teeter-totter 57 with said 1st and 2nd presser-foot bars 51. It will be understood that, while I prefer the use of a teeter-totter or its equivalent to reciprocate the 1st and 2nd presser-foot bars 51 in 180° out-of-phase relationship, my invention also contemplates the use of other interconnecting means for effecting the reciprocation in 180° out-of-phase relationship. This includes separate and independent means conventionally constructed to interconnect 1st and 2nd bars with 1st and 2nd operating shafts for reciprocating purposes but unconventionally arranged for out-of-phase purposes.

Each of the 1st and 2nd thread pull means may be conventional except for an adjustment feature. Each thread pull means includes: (1) a rigid orbital pin-link unit composed of (a) said crank pin 43, which is rigidly mounted on crank wheel 42 to project from an end face thereof for orbiting purposes and (b) a link 62 rigidly mounted at one end of said projecting orbital crank pin 43; (2) a somewhat L-shaped thread pull lever 63 pivotally mounted on the outer end of said link 62 with its opposite end 64 available for thread pull purposes; and (3) a guide lever 65 pivoted at one end to a fixed post 66 on said box-frame partition 34 and pivotally connected at its opposite end to the mid-portion of said guide level 65 for guiding purposes.

In accordance with a particular feature of my invention, the pull lever 63 on the thread can be advanced or retarded by angularly turning the orbiting pin-link unit, one way or another, about the axis of its orbital crank pin 43 from one position to another and securing it in its turned or adjusted position. To this end, the orbital crank pin 43 is rigidly mounted on crank wheel 42 to project from the end face thereof. It is fixed in its desired position by a set screw 67. This adjustment effects an advance or delay in the thread pulling function of the thread bar.

Common drive for dual heads

In accordance with one important feature of my invention, both *multi or dual* heads are driven by a common drive which includes: (1) a main drive shaft; and (2) gear means connecting the main drive shaft to the 1st and 2nd operating shafts 40.

The main drive shaft 70 extends transversely across the machine from the large A-frame side standard 12. Within standard 12, it is connected in any conventional or other suitable manner to the main drive motor 19. In extending across the machine from standard 12, shaft 70 passes entirely through the 1st two box-frames 30 and terminates within the gear chamber 35 of the third and last box-frame.

The gear means located in the gear chamber 35 of the 1st box-frame is reproduced in each of the other gear chambers 35 of the remaining box-frames. Each gear means comprises: (1) a main drive gear 71 mounted on the main drive shaft 70; and (2) 1st and 2nd driven gears 72, 73 respectively mounted on the 1st and 2nd operating shafts 40 of the 1st and 2nd sewing heads and connected thereto in a manner causing the 1st operating shaft to rotate in the same direction as the main drive shaft 70 and the 2nd operating shaft 40 to rotate in the reverse direction. To this end the driven gear 73 on the 2nd operating shaft is arranged to mesh with the main drive gear 71 on the main drive shaft 70 while the driven gear 72 on the 1st operating shaft 40 is connected to the main drive gear 71 through an idler 74.

Operation

Since the operation of the sewing machine will be clear from the foregoing, it should suffice to say: (1) that, when energized, motor 19 (a) drives the front feed rolls 24 and the rewind roll 25 for material feeding and rewinding purposes, (b) reciprocates the A-frame 10, (c) drives the dual heads in a positive manner and in 180° out-of-phase relationship to reciprocate both needle bars 41, both presser-foot bars 51 and both thread pull levers 63 and (d) rotates the thread locking mechanism in the lower A-frame cross frame member 14. As a result: (a) the material is fed forwardly through the machine more or less constantly although the movement of that material at and through the sewing zone is momentarily stopped in a conventional manner by presser-foot engagement; (b) the main drive shaft 70 rotates continuously; (c) the positively driven 1st and 2nd operating shafts 40 of the sewing heads rotate continuously but in opposite directions and in 180° out-of-phase relationship; (d) the 1st and 2nd needle bars 41 reciprocate continuously in a positive manner and in an 180° out-of-phase relationship to effect the sewing of straight or zigzag lines which are laterally spaced and longitudinally parallel; (e) the 1st and 2nd presser-foot bars reciprocate continuously in a positive manner (with a slight dwell period during the lower end portion of each downward stroke) and do so in 180° out-of-phase relationship; and (f) 1st and 2nd thread guide levers 65 jerk up and move down in 180° out-of-phase relationship with each lever being adjustable to advance or retard the beginning of its particular thread jerking action.

Modification

Figure 11:
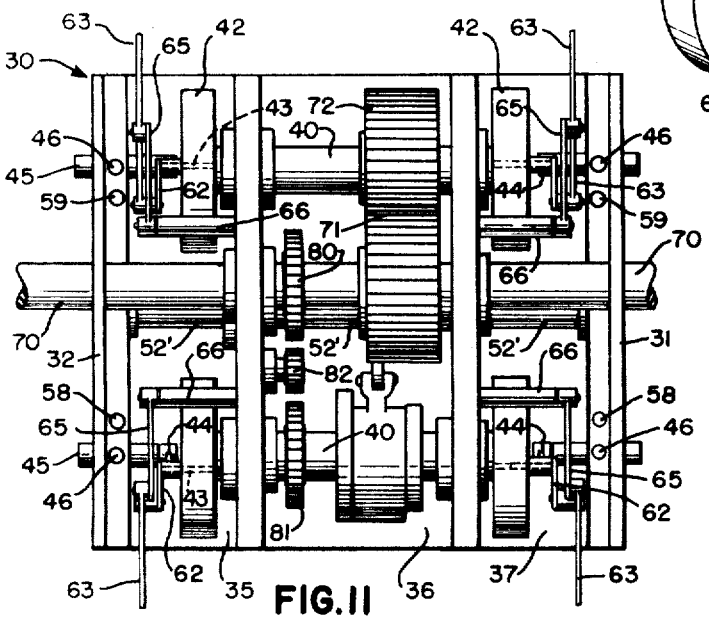
FIG. 11 is a top plan view of a modification utilizing duplicate sewing needle and presser foot operating mechanisms at each end in each of two heads, this view omitting the top plate.
Figure 11A:
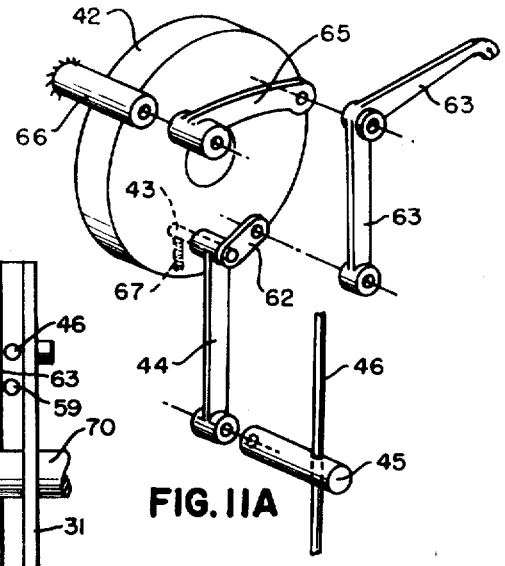
FIG. 11A is an exploded perspective view of the needle-operating and thread-pull assemblies as seen in the upper right hand corner of FIG. 11.
Figure 12:
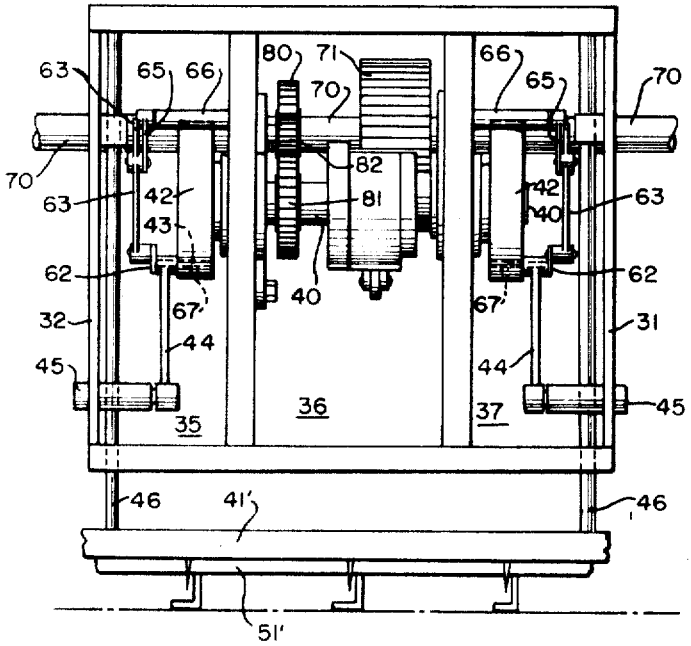
FIG. 12 is a front-side elevation of the structure seen in FIG. 11, this view omitting the corresponding side plate of the box frame 30.

The preferred embodiment of FIGS. 1–10 uses single 1st and 2nd needle bars 41 and presser-foot bars 51 for all three of the box-frames and for all three of the 1st and 2nd dual heads on such box-frames. My invention, however, contemplates the use of separate individual needle and presser-foot bars and four bar-supporting rods for each head on each separate box-frame. A modified construction of this character is illustrated in FIGS. 11, 11A and 12.

In this modification, the 1st "gear" chamber 35 of each box-frame is used as an additional "reciprocating" chamber while the positive common drive for the dual heads is slightly modified and transferred to the eccentric chamber 36. Since the space of eccentric chamber 36 is limited, the common drive is modified: (1) by placing the main drive gear 71 on the main drive shaft 70 in mesh with the driven gear on one of the operating shafts, in this case the 1st driven gear 72 on the 1st operating shaft 40 whereby shafts 70 and 40 rotate in opposite directions; (2) by eliminating the 2nd drive gear from the 2nd operating shaft 40; and (3) by driving the 2nd operating shaft 40 from (and in the same direction as) the main drive shaft 70 through a drive train comprising a sprocket 80 on the main drive shaft 70, a sprocket 81 on the 2nd operating shaft 40, and a chain (not shown) interconnecting the two, the chain also engaging an intermediate idler 82, which can be adjustably positioned for chain-tensioning purposes.

The rock shaft 52' (which, in the embodiment of FIGS. 1–10, extends from the 2nd chamber of the box-frame into the 3rd chamber thereof), is now extended into the 1st chamber of each box-frame and a duplicate, of the sewing head, presser-foot and thread pull mechanism, is installed within the 1st chamber of each box-frame 30. This duplicate carries one vertically-arranged pair of 1st and 2nd (needle-bar) reciprocating rods 46 and one vertically-arranged pair of 1st and 2nd (presser-foot-bar) reciprocating rods 58, 59, which depend from within each end of each box-frame 30 downwardly into supporting engagement respectively with the corresponding ends of one pair of short 1st and 2nd needle bars 41' and of one pair of short 1st and 2nd presser-foot bars 51'. In other words, each short needle bar 41' and presser-foot bar 51', for a given box-frame, is supported at each of its opposite ends by reciprocating rods depending from said given box-frame.

It will be understood that my invention contemplates the out-of-phase rotation of both rockshafts 40 in the same direction because in such operation, a significant amount of counter-balancing should occur. I prefer reverse 180° out-of-phase rotation because the maximum amount of counter-balancing will occur.

Having described my invention, I claim:

1. *Multi or dual* [Dual] heads for a multi-needle machine of the type sewing a series of long straight or zigzag lines of stitching into elongate superposed strips of bedding material passing through the machine, comprising:

A substantially identical 1st and 2nd sewing heads, one on each side of a vertically arranged transverse plane, said 1st and 2nd sewing heads including
  1. a frame, and
  2. corresponding 1st and 2nd
    a. frame-mounted multi-needle bars, and
    b. frame-mounted means for positively reciprocating said multi-needle bars vertically; and B. a common drive means for positively driving both sewing heads in a substantially fixed *out-of-phase* [phase] relationship [.] *wherein said common means includes*
  *1. 1st and 2nd rotary shafts, and*
  *2. means for rotating said shafts in opposite counter-balancing directions.*

[2. The dual heads of claim 1 wherein:

A. said common means includes
  1. 1st and 2nd rotary shafts, and
  2. means for rotating said shafts in opposite directions.]

3. The dual heads of claim [2] *1* wherein:

A. said common drive means is connected to drive said sewing heads in 180° out-of-phase relationship.

4. The dual heads of claim [2] *1* wherein:

A. said 1st and 2nd sewing heads include corresponding 1st and 2nd
  1. frame-mounted presser-foot bars, and
  2. frame-mounted means for positively reciprocating said presser-foot bars vertically; and B. said common drive means is connected to [drive] *reciprocate* said presser-foot bars in 180° out-of-phase relationship but with the reciprocations of each presser-foot bar being operatively coordinated with the reciprocations of its corresponding needle bar.

5. The dual heads of claim 1 wherein:

A. the 1st sewing head includes, *as said 1st rotary shaft,* a 1st horizontal frame-mounted rotary drive shaft between the 1st multi-needle bar and said common drive means; and B. said dual heads include presser-foot means composed of
  1. 1st and 2nd presser-foot bars, one on each side of said plane,
  2. a rockshaft in said plane,
  3. motion converting means interconnecting said 1st drive shaft and said rockshaft to convert the rotary motion of the 1st shaft into rockshaft rocking movement, and
  4. a teeter-totter mounted on said rockshaft to rock therewith and operative, when rocked, to reciprocate said 1st and 2nd presser-foot bars in 180° out-of-phase relationship.

6. The dual heads of claim 1 wherein:

A. the 1st sewing head includes, *as said 1st rotary shaft,* a 1st horizontal frame-mounted rotary drive shaft in the drive connection between the 1st multi-needle bar and said common drive means,
  1. said 1st shaft having a crank wheel; and B. said 1st head has a 1st thread pulling means, which includes
  1. a wrist pin offset from the axis of said crank wheel and mounted thereon to project from an end face thereof,
  2. a radial link rigidly mounted on the projecting portion of said wrist pin and cooperating therewith to provide a rigid pin-link unit,
  3. a thread pull lever pivotally mounted at one end on an outer end portion of said radial link and arranged at its opposite end to engage the sewing thread for thread pulling purposes,
  4. a guide lever pivoted at one end to said frame and at its opposite end to the mid-portion of said thread pull lever for guiding purposes, and
  5. means for adjusting the angular position of said rigid pin-link unit one way or the other on said crank wheel so as to advance or retard the time at which said pull lever exerts a pull on said thread.

7. The dual heads of claim 6 wherein:

A. the 2nd sewing head [has] *includes, as said 2nd rotary shaft,* a 2nd rotary drive shaft substantially identical to the 1st;

B. said 2nd head has a 2nd thread pulling means substantially identical to the 1st; and C. said common drive means is connected to drive said 1st and 2nd thread pull means in a substantially fixed phase relationship which is is coordinated to the reciprocations of the corresponding multi-needle bars.

[8. The dual heads of claim 7 wherein:

A. said common means includes 1. 1st and 2nd rotary shafts, and 2. means for rotating said shafts in opposite directions.]

9. The dual heads of claim [8] 7 wherein:

A. said common drive means is connected to drive said 1st and 2nd sewing heads in 180° out-of-phase relationship.

References Cited

The following references, cited by the Examiner, are of record in the patented file of this patent or the original patent.

UNITED STATES PATENTS

| | | | |
|---|---|---|---|
| 3,650,228 | 3/1972 | Lynch | 112—79 R |
| 2,217,967 | 10/1940 | Phillips | 112—206 X |
| 3,476,063 | 11/1969 | Bulgatz | 112—121.14 |
| 3,396,687 | 8/1968 | Nowicki | 112—266 X |

GEORGE V. LARKIN, Primary Examiner

U.S. Cl. X.R.

112—155